United States Patent
Kennedy

(10) Patent No.: US 7,782,208 B2
(45) Date of Patent: *Aug. 24, 2010

(54) DYNAMIC INVENTORY MANAGEMENT OF DEPLOYED ASSETS

(75) Inventor: Peter J. Kennedy, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 117 days.

This patent is subject to a terminal disclaimer.

(21) Appl. No.: 12/187,978

(22) Filed: Aug. 7, 2008

(65) Prior Publication Data

US 2009/0045915 A1    Feb. 19, 2009

Related U.S. Application Data

(63) Continuation of application No. 11/366,338, filed on Mar. 2, 2006, now Pat. No. 7,417,547.

(51) Int. Cl.
*G08B 13/14* (2006.01)

(52) U.S. Cl. ............ 340/572.1; 340/568.1; 340/825.49; 340/539.1

(58) Field of Classification Search ............... 340/572.1, 340/568.1, 825.49, 5.92, 539.1, 825.36, 539.13, 340/539.11, 572.2–572.9
See application file for complete search history.

(56) References Cited

U.S. PATENT DOCUMENTS

| | | | |
|---|---|---|---|
| 5,519,403 A | 5/1996 | Bickley et al. | |
| 5,664,113 A | 9/1997 | Worger et al. | |
| 6,195,006 B1 | 2/2001 | Bowers et al. | |
| 6,226,913 B1 | 5/2001 | Hainovich et al. | |
| 6,600,418 B2 * | 7/2003 | Sainati et al. | 340/572.1 |
| 6,853,303 B2 | 2/2005 | Chen et al. | |
| 7,042,334 B2 | 5/2006 | Mosgrove et al. | |
| 7,050,991 B2 | 5/2006 | Ogasawara | |
| 2002/0149468 A1 | 10/2002 | Carrender et al. | |
| 2004/0177032 A1 * | 9/2004 | Bradley et al. | 705/38 |
| 2004/0243721 A1 | 12/2004 | Stultz et al. | |
| 2005/0258961 A1 | 11/2005 | Kimball et al. | |
| 2006/0116899 A1 * | 6/2006 | Lax et al. | 705/1 |

* cited by examiner

*Primary Examiner*—Daniel Previl
(74) *Attorney, Agent, or Firm*—Patents on Demand, P.A.; Brian K. Buchheit

(57) ABSTRACT

A dynamic inventory management method can include the step of attaching a location tag to a deployable asset. A mobile entity can be associated with the location tag. A tag scanner can scan for location tags within a range of the tag scanner. Data can be conveyed from the tag scanner to a communicatively linked inventory control system. The scanning and conveying steps can be repeated to dynamically update the inventory control system.

5 Claims, 5 Drawing Sheets

DYNAMIC INVENTORY MANAGEMENT OF DEPLOYED ASSETS

CROSS-REFERENCE TO RELATED APPLICATIONS

This is a continuation application of and which claims the benefit of U.S. patent application Ser. No. 11/366,338, filed 2 Mar. 2006 and which is hereby incorporated by reference.

BACKGROUND OF THE INVENTION

The present invention relates to the field of inventory management, and, more particularly, to dynamic inventory management of deployed assets.

Although inventory management can be important in many situations, it can be absolutely essential for mission critical assets used in a deployed context. For example, a soldier deployed in an operational environment can be assigned a firearm, ammunition, chemical gear, a communication device, and the like, each of which is needed to perform the soldier's mission. When the soldier lacks one or more of these mission critical assets, either his life is in danger or his mission objectives are unable to be accomplished. In many instances, the mission critical assets carried by one soldier may be redundant to assets carried by another soldier. The ability to rapidly determine when one soldier lacks a mission critical asset and to reequip that soldier using a surplus asset held by another soldier could be determinative to the success of a military mission. Current inventory management systems do not provide for the dynamic redistribution of assets. Further, current inventory management systems to not permit real-time deployed asset monitoring.

Similar situations exist outside a military context. For example, teams of power repair personnel involved in post-disaster power restoration efforts can have a number of assets, such as transformers, power cables, tools, and the like that are mission critical assets for restoring power. In another example, theater costumes, prompts, sound equipment, can be considered mission critical assets for an entertainment event. In yet another example, a corporation can have a limited number of mobile mission critical assets, such as notebook computers, projection devices, marketing material, support equipment, and the like, which are not always available when needed, the lack of which can cause essential business deals to fall through. In still another example, blood supplies of various kinds can be a mission critical asset for a network of hospitals or for deployed Red Cross teams treating disaster victims. Accordingly, many contexts exist where assets are deployed, and where these assets are needed to perform a mission or to accomplish an objective.

SUMMARY OF THE INVENTION

A deployed asset solution is disclosed herein where assets are associated with location tags that are used for asset location and distribution. More specifically, location tags, such as Radio Frequency Identification (RFID) tags, can be attached to portable assets. These assets can be assigned to people, who carry computing devices capable of scanning for the RFID tags. The computing devices can also include a wireless transceiver for exchanging digital information over a wireless network and a Global Positioning System (GPS) receiver for determining asset locations. The tag scanner can continuously poll a scanning region for nearby location tags to determine if a person possesses those assets which the person should have. Inventory and positioning information can be conveyed from multiple asset scanning devices to an inventory control server. The inventory control server can dynamically redistribute attributes according to mission needs. The inventory control server can also provide decision makers with accurate, updated information regarding deployed assets and their locations.

This information can be used to help decision makers establish policies and construct missions, which are able to be reasonably accomplished with available resources. The solution can also provide real time updates for situation assessment purposes.

The present invention can be implemented in accordance with numerous aspects consistent with material presented herein. For example, one aspect of the present invention can include a dynamic inventory management method. The method can include the step of attaching a location tag to a deployable asset. A mobile entity can be associated with the location tag. A tag scanner can scan for location tags within a range of the tag scanner. Data can be conveyed from the tag scanner to a communicatively linked inventory control system. The scanning and conveying steps can be repeated to dynamically update the inventory control system.

Another aspect of the present invention can include an asset management system that includes deployed assets, at least one tag scanner, at least one communication hub, and an inventory control server. The deployed assets can be associated with location tags. The tag scanner can periodically scan a region to discover the location tags within the region. The location communication hub can be linked to the tag scanner and can wirelessly communicate asset information obtained from the tag scanner and the location tags to the remotely located inventory control server. The inventory control server can continuously update an asset database with information provided by one or more location communication hubs.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
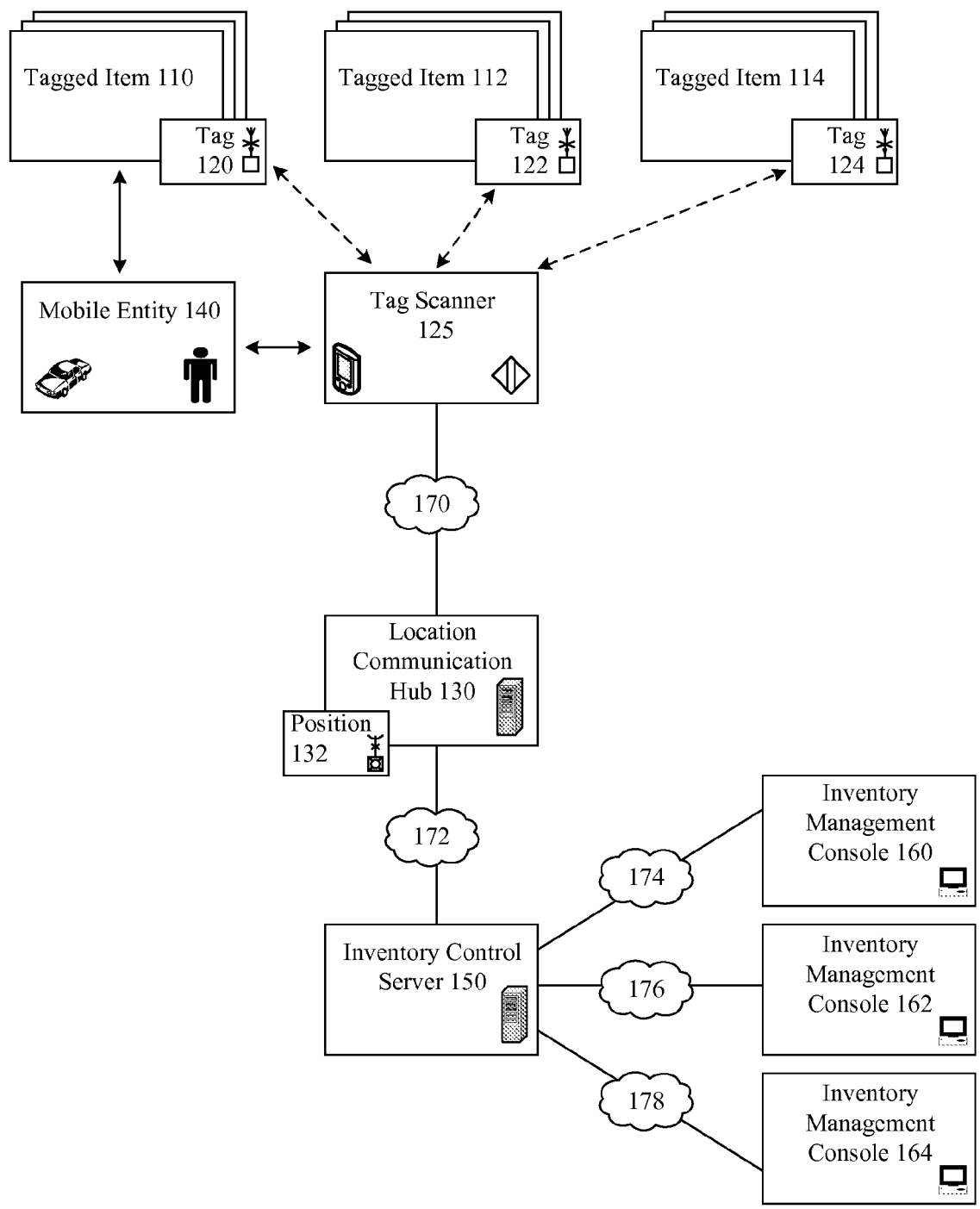
FIG. 1 is a schematic diagram of a system for real time inventory management of deployed assets in accordance with an embodiment of the inventive arrangements disclosed herein.

FIG. 1 is a schematic diagram of a system 100 for real time inventory management of deployed assets in accordance with an embodiment of the inventive arrangements disclosed herein.

System 100 includes tagged items 110-114, each having a location tag 120-124 that can be read by tag scanner 125. The tag scanner can intermittently communicate with the tags 120-124 so that information about which tags 120-124 are proximate to tag scanner 125 is constantly updated. A designated mobile entity 140 can carry or be equipped with each tagged item 110-114 and/or tag scanner 125. Information from tagged scanner 125 can be conveyed over communication link 170 to location communication hub 130. The location communication hub 130 can be associated with a position detection device 132.

The communication hub 130 can communicate with inventory control server 150 via network 172. Inventory control server 150 can provide real time or near real time inventory updates to management consoles 160-164 via networks 174-178.

In one embodiment, the inventory information provided by the inventory control server 150 can be sanitized for different security levels. For example, network 174 can be a Non-classified Internet Protocol Router Network (NIPRNET) compliant network over which unclassified, but sensitive information can be exchanged between server 150 and console 160. Network 176 can be a Secret Internet Protocol Router Network (SIPRNET) compliant network over which secret information can be securely conveyed. Network 178 can be a Joint Worldwide Intelligence Communications System (JWICS) compliant network over which Top Secret/Sensitive Compartmented Information (TS/SCI) can be securely conveyed. Networks 174-178 are not limited in this regard, however, and can represent any network over which carrier waves including digitally encoded information can be conveyed.

Each tagged item 110-114 can be a mobile asset. Tagged items 110-114 can be portable items carried by a user as well as semi-fixed items attached to mobile vehicles. The tagged items 110-114 can include mission critical assets. A mission critical asset is an asset which if lost is able to cause a mission or operation to fail or be aborted. For example, mission critical assets for a combat soldier can include a night vision scope, one or more firearms, ammunition clips, explosive devices, communication gear, and the like.

Each tagged item 110-114 can be associated with a location or identification tag 120-124. The identification tag 120-124 can wirelessly communicate with tag scanner 125. Each tag 120-124 can include active, semi-active, and/or passive mechanisms used to ascertain locations and/or information about an associated tagged item 110-114. These passive and active mechanisms can include transponders, wireless transceivers, processors, electronic memory spaces, and the like.

In one embodiment, each location tag 120-124 can be implemented as a Radio Frequency Identification (RFID) tag. Each tag 120-124 can be coded for and attached to a tagged asset 110-114. Whenever the tagged item 110-114 is within range of tag scanner 125, the tag scanner 125 can read the information encoded within the tag 120-124.

The invention is not to be construed as limited to the utilization of RFID tags, however, and other embodiments are contemplated. For example, a wireless personal area network (PAN) can be established between each tag 120-124 and the tag scanner 125 through which information can be wirelessly conveyed. The PAN can utilize any of a variety of technologies, such as BLUETOOTH, WIFI (802.11 family of protocols), and ZIGBEE.

Configuration specifics for the tag scanner 125 can be dependent upon the technology utilized for the location tags 120-124. Generally, tag scanner 125 can be a computing device configured to determine a proximate location for each of the tags 120-124.

In one embodiment, the tag scanner 125 can be a computing device capable of performing rudimentary inventory operations. For example, each tagged item 110-114 can be associated with a different soldier in a unit, which is within range of tag scanner 125. Particular soldiers can carrier surplus items 110-114. The tag scanner 125 can automatically detect whenever one soldier no longer carries a required tagged item 110-114 and can responsively notify the soldier that he/she lacks a necessary item. The tag scanner 125 can also determine a solder carrying a replacement item as a surplus item, and can coordinate the transfer of the surplus item to the solder that lacks the tagged item 110-114.

For instance, one soldier can be running low on ammunition, and the tag scanner 125 (capable of reading magazine utilization from tags 120 attached to ammunition magazines) can prompt a nearby soldier having excess ammunition to provide the lacking soldier with a portion of the surplus ammunition.

The tag scanner 125 can exchange with the location communication hub 130 over link 170. In one embodiment, the tag scanner 125 and location hub 130 can be implemented as one integrated device. In another embodiment, the tag scanner 125 can be separate from, but linked to the location communication hub 130. For example, the tag scanner 125 can include a BLUETOOTH or WIFI transceiver that communicates with the location communication hub 130. Location communication hub 130 can include a satellite uplink or other network connection for exchanging data with the inventory control server 150.

Each tagged item 110-114 and/or the tag scanner 125 can be associated or assigned to a mobile entity 140. The mobile entity 140 can include a human being, a vehicle, an automated machine (such as a drone or robot), and the like. In one embodiment, each mobile entity 140 can have a location tag (not shown) associated with them, which can be tracked by the tag scanner 125. For example, a soldier can have an RFID tag embedded under his/her skin or located inside his/her footwear, which can be used to identify and locate the soldier. In another example, a high mobility multipurpose wheeled vehicle (HMMWV or HUMV) can be a mobile entity 140 that includes a location tag (not shown) that can be tracked using the tag scanner 125.

The location communication hub 130 can be a device that receives information from one or more tag scanner 125 and communicates this information to the inventory control server 150 via network 172. The location communication hub 130 can identity a relative geographical position for each tagged item 110-114, mobile entity 140, and tag scanner 125, as well as inventory status information about each. The positioning information can be obtained from one or more position detection devices 132. A position detection device 132 can include a global positioning system (GPS) or other positioning device, such as a long range navigation (LORAN) device.

Additionally, position detection devices (not shown) can be embedded within tag scanner 125 and mobile entity 140. The position detection devices can determine an absolute location or a relative location. For example, if multiple tag scanners 125 are distributed in a geographical area, each having a known location, a relative location of each of the location tags 120-124 can be determined automatically using triangulation techniques.

An inventory control server 150 can dynamically manage tagged items 110-114. The deployed assets managed by the inventory control server 150 can include tagged and untagged assets. For example, in one embodiment, only mission critical assets are tagged, where other assets having relatively less importance can be tracked using conventional techniques. Conventional techniques can require that data base information be manually entered into a computing device. In a hybrid environment having tagged 110-114 and non-tagged assets, information about the non-tagged inventory assets can be inferred from the tagged items 114. For example, if jeeps are tagged items 110-114 that are used to transport untagged assets, then locations of the transported untagged assets can be inferred by the inventory control system 150 base upon the jeep locations.

The inventory management consoles 160-164 can be management consoles used to oversee, direct, and plan a deployed operation. For example, inventory management console 162 can be used by a logistics support unit to direct supplies to deployed units. Console 164 can be used by battle staff to plan and coordinate operational missions. Console 160 can be a media communication system that is used to provide situational updates (unclassified) to news media organizations about a current operation.

It should be appreciated that although the examples presented above are largely military examples, the present invention is not limited to military contexts. Instead, the invention can be utilized for dynamic, real time inventory management in any circumstance where such inventory management is beneficial.

For example, a disaster recovery team can utilize the location tags 120-124 to tag disaster recovery assets, such as potable water, fuel, blankets, generators, transformers, repair trucks, and the like. Using tagged assets, a disaster recovery coordinator can properly and dynamically distribute assets to those areas where the need is highest. For instance, multiple deployed power repair trucks, each having power repair supplies, can share repair resources with one another. Therefore, a repair truck in need of a transformer (tagged item 110-114 in this example) to repair a down power grid, can quickly acquire the transformer from a nearby repair truck having surplus transformers.

In another example, each float in a large parade can include location tags 110-114 indicating supply levels for the float. Supply levels can include vehicle fuel, water and food for float personnel, and parade handouts. Whenever any float in the parade begins to run short on supplies, supplies can be dynamically transferred from other floats having surplus supplies and/or supplies can be acquired from supply depots.

Figure 2:
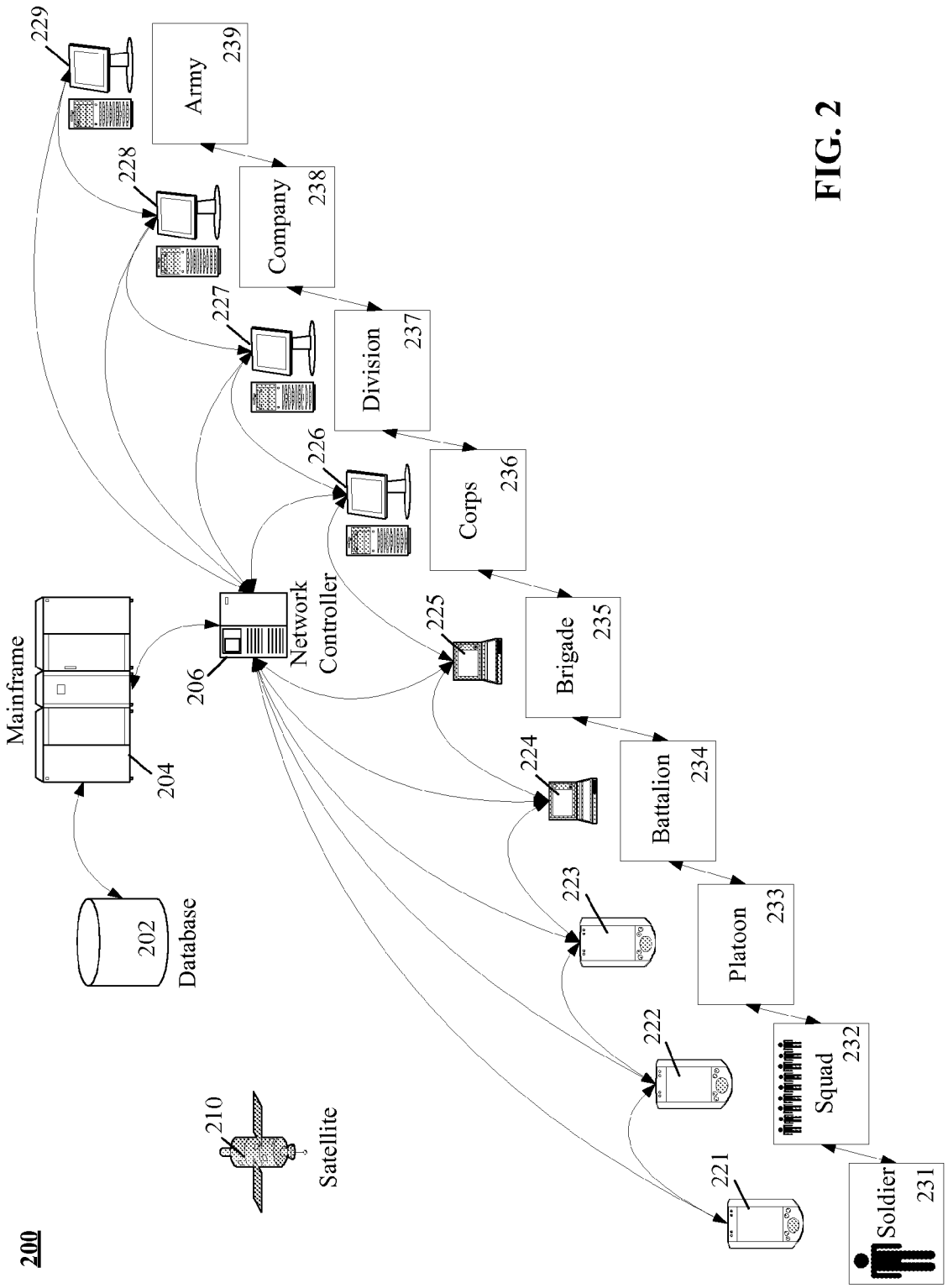
FIG. 2 is a schematic diagram of a chain of command inventory management system in accordance with an embodiment of the inventive arrangements disclosed herein.

FIG. 2 is a schematic diagram of a chain of command inventory management system 200 in accordance with an embodiment of the inventive arrangements disclosed herein. System 200 can be one configuration for system 100, where deployed assets are able to be dynamically managed in real time and accessed by every level of a military organization.

In system 200, database 202 can be a centralized repository for deployed assets. An inventory control server 204 can access and update database 202. Network controller 206 can control the exchange of information between asset computing devices 221-229 and the inventory control server 204. One or more satellites 210 can be used to exchange information from remotely located ones of the computing devices 221-229 and the network controller 206.

Additional network resources (not shown), such as Internet, NIPRNET, SIPRNET, and JWICS resources are contemplated herein. It should also be appreciated that the communication pathways between each computing device 221-229 can be encrypted and masked to prevent an enemy from either intercepting communications and to obscure locations of mobile entities and tagged assets. In one embodiment, fake transmissions can be established to fool an enemy into thinking soldiers and tagged assets are in locations, where none actually are, as part of an information warfare strategy to mislead enemy forces.

In system 200, the basic building block or unit of a military organization can be a soldier 231. Each soldier 231 can carry a communication hub 221 that is optionally equipped with a GPS receiver. The communication hub 221 can include a wireless transceiver and a tag scanner. Each mission critical resource associated with the soldier 231 can be tagged. The hub 221 can periodically scan for tagged assets carried by the soldier 231, reporting when a mission critical asset is absent. The reporting can be performed to the soldier 231 as well as to any supervisor within the chain of command (232-239).

The next level in the chain of command can include a squadron 232 of nine or ten soldiers lead by a sergeant. The squadron device hub 222 can monitor all tagged assets of the squadron and can automatically suggest new asset distributions within the squadron based upon surpluses and deficiencies. In one embodiment, no soldier level hub 221 may be necessary, since the squadron level hub 222 may have sufficient scanning range to detect location tags of all tagged assets carried by soldiers 231 in the squadron 232.

In another embodiment, each soldier 231 can carry a modified hub 221 capable of exchanging information with the sergeant's (or squadron's communication person's) squadron level device 222. These devices 221-222 can be physically identical devices having a soldier mode and a sergeant mode. The soldier mode can be a very low power mode, which only communicates short distances to device 222. The sergeant mode can operate on higher power and be capable of transmitting signals to other devices 222 operating in sergeant mode, and to one or more devices 223 operating in a higher mode. Should something happen to the sergeant's device 222, one of the other devices 221 can automatically be upgraded to sergeant mode to prevent communication lapses.

Above the squadron 232, is a platoon 233, which can consist of two to four squadrons and which can be lead by a lieutenant. One platoon device 223 can be set for lieutenant mode, which permits lieutenants to exchange asset information with one another. In one embodiment, information can be conveyed to another device 221-229 directly up and down the chain of command, one level at a time. Information can also be exchanged among devices 221-229 at the same level within the chain of command. Additionally, information can be exchanged directly with the network controller 206.

In another embodiment, the devices 221-229 when taken together form a cooperative network capable of communicating with the mainframe 204, so long as one or more devices 221-229 linked to each other is also linked to the network controller 206. Accordingly, system 200 can include a plurality of redundant communication pathways for indirectly exchanging device 221-229 inventory data with the network controller 206.

A company 238 can be led by a captain and can control multiple platoons 233. A mobile workstation 225 can provide company level asset management and command and control functions. The various platoons 233, each lead by a company captain, can be geographically distributed.

Multiple communication paths are possible for conveying information from a platoon device 223 to a company device 228. For example, platoon 234 information can be conveyed from device 223 to network controller 206 to device 228. In another example, platoon 234 information can be conveyed along the cooperative computing path of device 223 to 224 to 225 to 226 to 227 to 228. In this cooperative computing path, devices 224-227 can function as information routing devices may be restricted from accessing the data which they route. It should be appreciated from this example that each device 221-229 from a technical perspective can be communicatively linked to other devices 221-229 in a cooperative network in a manner unrelated to the chain of command. Nevertheless, from a functional perspective communications may only be permitted within the chain of command (typically one level up and one level down within the chain).

A battalion 224 can be led by a lieutenant colonel and can control multiple companies 238. The battalion 224 can include a mobile workstation 224, which can be a more powerful version of communication hub 221-223. For example, a mobile work station 224 can include command and control software for visually mapping and dynamically assessing all forces commanded by the lieutenant colonel 234. The mobile workstation 224 can also permit a lieutenant colonel 234 to configure logistic supply channels and to convey additional assets from relatively safe supply depots to troop areas in need of those supplies.

A brigade 235 can be led by a colonel and can control multiple battalions 234. A mobile workstation 225 can provide brigade level asset management and command and control functions.

A division 237 can be led by a major general and can control multiple brigades 235. A mobile workstation 227 can provide division level asset management and command and control functions.

A corps 226 can be led by a lieutenant general and can control multiple divisions 237. A mobile workstation 227 can provide corps level asset management and command and control functions.

An army 239 can be led by a general and can control multiple corps 226. A mobile workstation 229 can provide army level asset management and command and control functions.

Figure 3:
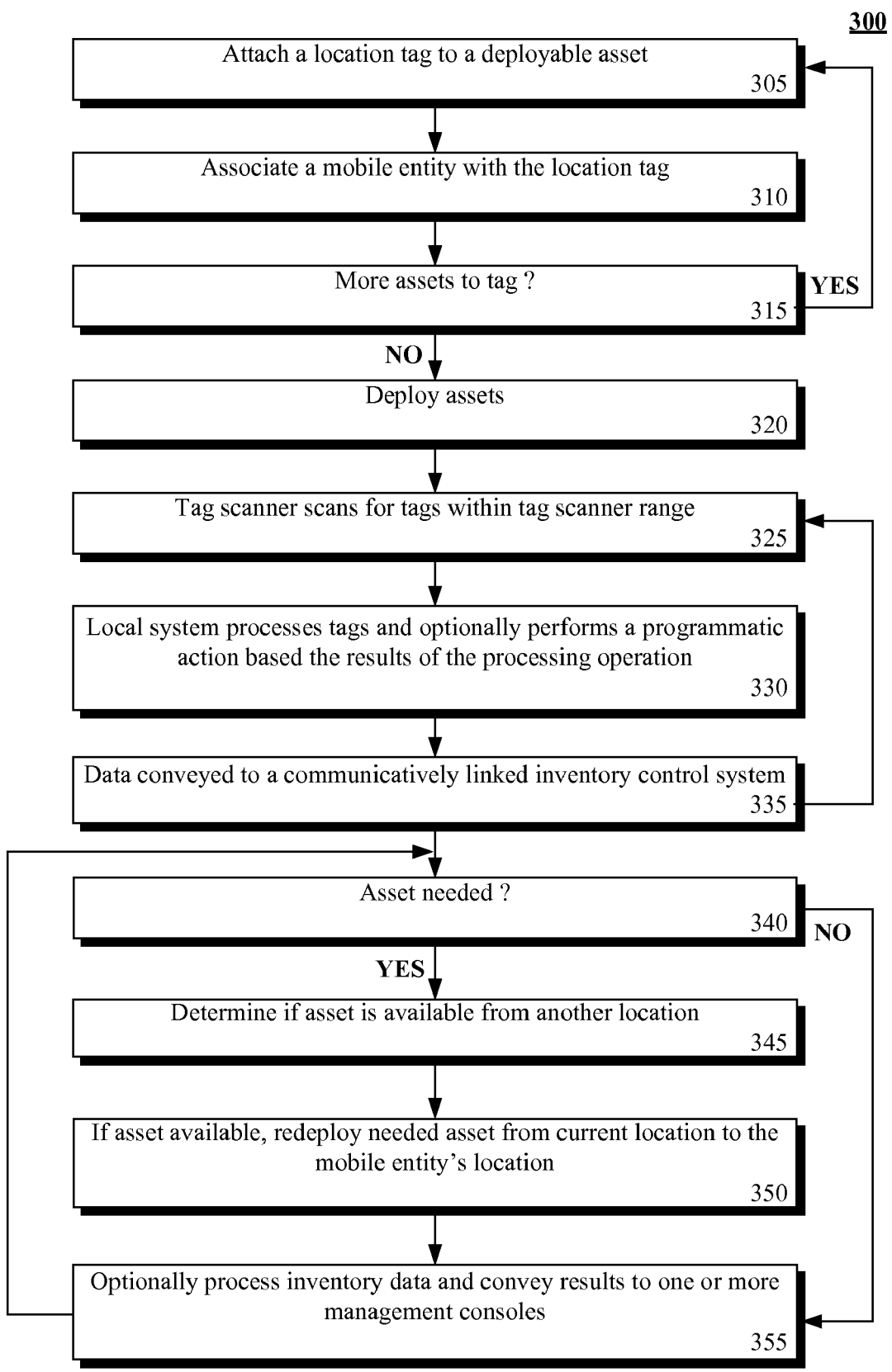
FIG. 3 is a flow chart of a method for managing deployable assets in accordance with an embodiment of the inventive arrangements disclosed herein.

FIG. 3 is a flow chart of a method 300 for managing deployable assets in accordance with an embodiment of the inventive arrangements disclosed herein. Method 300 can be performed in the context of a system 100.

Method 300 can begin in step 305, where a location tag can be attached to a deployable asset. In step 310, a mobile entity can be associated with the location tag. For example, the tag can be programmed specifically for the mobile entity when the deployable asset is issued to the mobile entity. In step 315, the method can loop from step 315 to step 305, where additional assets can be tagged and associated with the same or other mobile entities. Each mobile entity can be assigned multiple tagged assets. Particular tagged assets can be shared among multiple mobile entities.

When no additional assets need to be tagged, the method can proceed to step 320, where the assets can be deployed. In step 325, once deployed, a tag scanner can scan an area for tags. In step 330, a local system can process the tags found by the scanner and can optionally perform a programmatic action based on the results of the processing operation. For example, if the scanned tags indicate that one deployed asset is missing, the mobile entity responsible for the deployed asset can be notified. In another example, other mobile devices equipped with tag scanners can be queried to determine if other scanners have identified a location for the missing asset. If so, the asset can be conveyed to the mobile entity to which the asset has been assigned.

In step 335, deployed asset data, including location information for the assets, can be conveyed to a communicatively linked inventory control system. Additionally, step 335 can loop to step 325, where the tag scanner can again scan for tags. It should be appreciated that the scanning for tags can be a continuously repeated process. The conveying of data to the inventory control system need not follow the same cycle that the scanner follows. For example, the method 300 can be configured so that data is only conveyed to the inventory control system every ten scan cycles.

In step 340, the inventory control system can determine if assets are needed at any of the deployed locations. If not, the method can skip to step 335, where inventory data can be optionally processed and reported to management consoles. If assets are needed at one or more deployed locations, the method can progress from step 340 to step 345, where the inventory management console can determine if a needed asset is available. In step 350, if an asset is available, that asset can be redeployed from a current location to the location of the mobile entity in need. The replacement asset can be procured from a supply depot or from another mobile entity having a surplus asset or having a lesser need for the asset.

In step 355, the inventory data of the inventory control system can be summarized, data mined, and otherwise analyzed. For example, the inventory data can be summarized for a high level operations commander. The method can loop from step 355 to step 340, where new information can be conveyed from a deployed location to the inventory control system. The inventory control system can constantly receive updated asset information from deployed locations.

Figure 4:
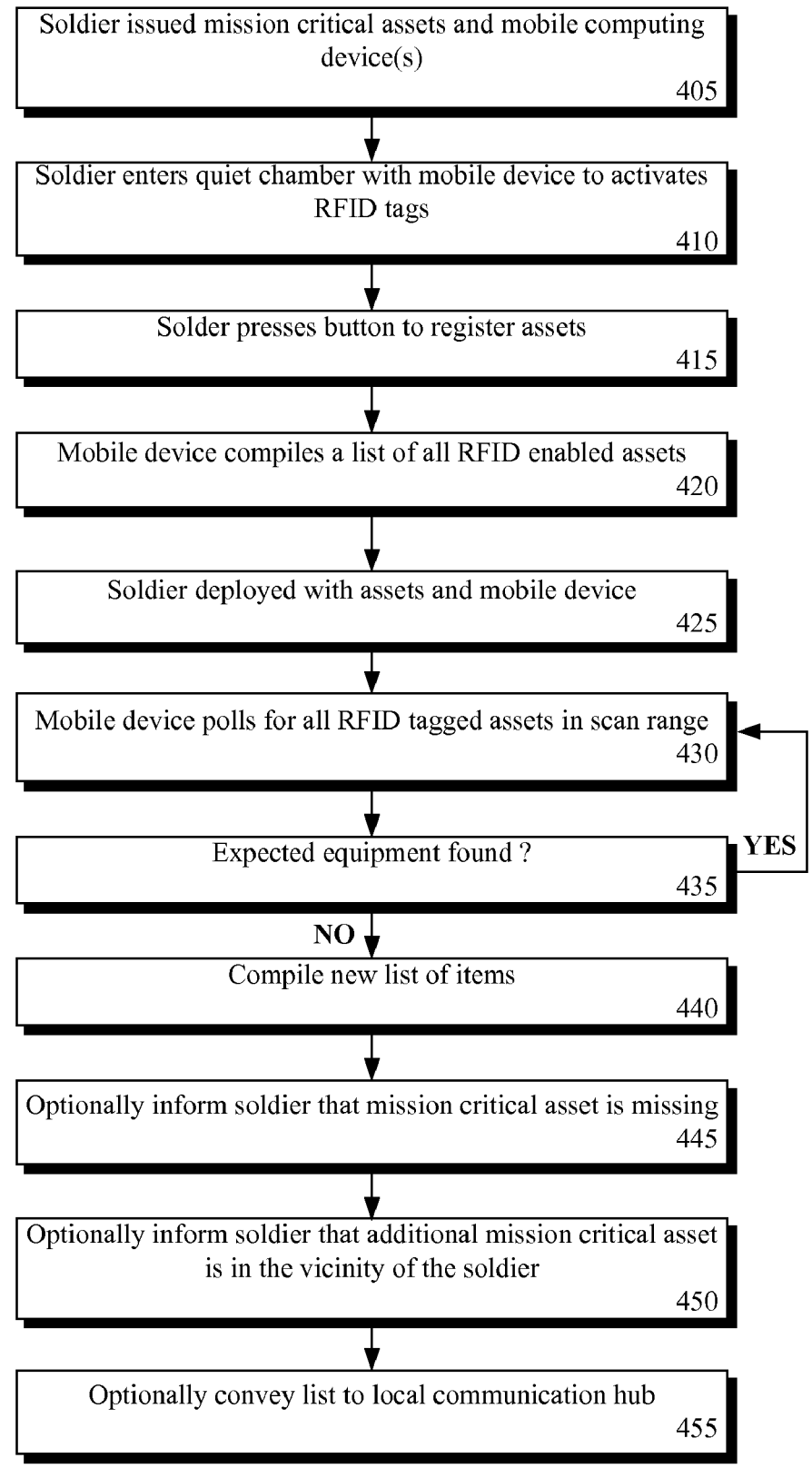
FIG. 4 is a method for deployed asset management within a military context in accordance with an embodiment of the inventive arrangements disclosed herein.

FIG. 4 is a method 400 for deployed asset management within a military context in accordance with an embodiment of the inventive arrangements disclosed herein.

Method 400 can begin in step 405, where a soldier can be issued mission critical assets and equipment having attached RFID tags. The soldier can also be issued one or more mobile computing devices for monitoring and communicating inventory status of issued items. In step 410, the soldier can enter a quiet chamber where the RFID tags can be associated with the soldier. In step 415, the soldier can press an enablement button on the mobile device to link the device to the tagged assets. In step 420, the mobile device can compile a list of all RFID enabled equipment assigned to the soldier.

In step 425, the soldier can be deployed, where his inventory assets and position are constantly being updated and transmitted to an inventory control system. In step 430, the mobile device can poll for all RFID tags within range of an RFID scanner. In step 435, when the equipment assigned to the soldier is located, the method can loop to step 430, where another scan for equipment can be performed after a configured delay period.

If in step 435, expected equipment is not found, the method can proceed to step 440, where a new list of items actually possessed by the soldier can be generated. In step 445, the soldier can be optionally informed that one or more assets are missing.

When the mobile device discovers tags associated with other soldiers, an action can be optionally taken. For example, the devices carried by those other soldiers can be queried to determine whether the other soldiers have lost their equipment, or whether the soldiers are proximately located the discovered asset. In step 450, when additional tagged assets are found that are not associated with a proper owner, the soldier can be optionally informed that additional assets are located in the soldier's vicinity. If the soldier recovers the asset, his inventory list can be automatically updated. In step 455, the inventory control list of the soldier can be conveyed to a local communication hub. The local communication hub can convey the control list to a remotely located inventory control server. Every time an asset anomaly is detected, the method can perform steps 440-455.

Figure 5:
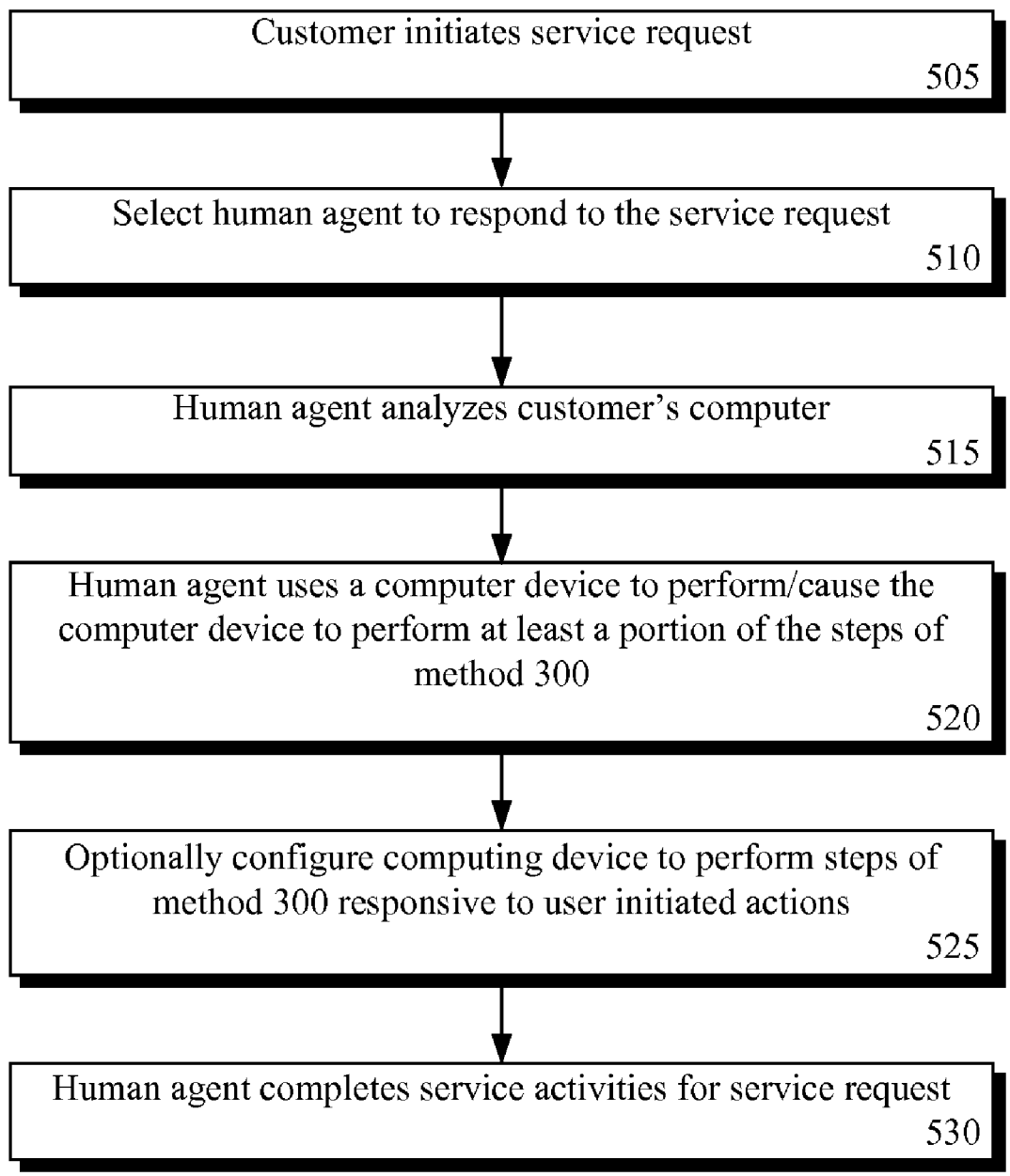
FIG. 5 is a flow chart of a method, where a service agent can configure a system that uses location tags with deployed assets for inventory purposes in accordance with an embodiment of the inventive arrangements disclosed herein.

FIG. 5 is a flow chart of a method 500, where a service agent can configure a system that uses location tags with deployed assets for inventory purposes in accordance with an embodiment of the inventive arrangements disclosed herein. Method 500 can be preformed in the context of system 100.

Method 500 can begin in step 505, when a customer initiates a service request. The service request can be a request for a service agent to establish a new dynamic asset management system for deployed assets. The service request can also be a request to troubleshoot a problem with an inventory tracking system or to provide an enhancement for an existing inventory tracking system.

In step 510, a human agent can be selected to respond to the service request. In step 515, the human agent can analyze a customer's current system and can develop a solution. The solution can include the acquisition and deployment of additional hardware, such as tag scanners, communication hubs, and location tags.

In step 520, the human agent can use one or more computing devices to perform or to cause the computer device to perform the steps of method 300. In optional step 525, the human agent can configure a computing device of the customer in a manner that the customer or clients of the customer can perform one or more steps of method 300 in the future. For example, the service agent can load and configure software and hardware so that deployed assets will be automatically detected by a tag scanner, which conveys information to an inventory control server. In step 530, the human agent can complete the service activities.

It should be noted that while the human agent may physically travel to a location local to adjust the customer's computer or application server, physical travel may be unnecessary. For example, the human agent can use a remote software agent to remotely manipulate the customer's computer system and/or a location communication hub.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer program product in a machine-readable storage recording medium having stored thereon, a computer program having a plurality of code sections, said code sections executable by a machine, said computer program product comprising:

a code section operable by a machine to attach a location tag to a deployable asset;

a code section operable by a machine to associate a mobile entity with the location tag;

a code section operable by a machine to scan at a tag scanner for location tags within a range of the tag scanner;

a code section operable by a machine to convey data from the tag scanner to a communicatively linked inventory control system; and a code section operable by a machine to repeat the codes sections to scan and convey to dynamically update the inventory control system, wherein the inventory control system is linked to a plurality of consoles via a plurality of networks, wherein the plurality of networks have different security levels, and wherein the inventory control system adjusts content to a highest allowable security level corresponding to a carrier network when conveying data to the consoles via the networks.

2. An asset management system comprising:

a plurality of deployed assets, each deployed asset associated with a location tag;

at least one tag scanner configured to periodically scan a region to discover the location tag of each of the deployed assets within the region;

at least one location communication hub linked to the at least one tag scanner configured to wirelessly communicate asset information obtained from the tag scanner and each location tag to at least one remotely located inventory control server; and the inventory control server configured to continuously update an asset database with information provided by the at least one location communication hub, wherein the inventory control server is linked to a plurality of consoles via a plurality of networks, wherein the plurality of networks have different security levels, and wherein the inventory control server adjusts content to a highest allowable security level corresponding to a carrier network when conveying data to the consoles via the networks.

3. The asset management system of claim 2, wherein each deployed asset is a mission critical asset assigned to a soldier, and wherein each location tag is an RFID tag.

4. The asset management system of claim 2, wherein the at least one location communication hub further comprises a position detection device, wherein the at least one communication hub wirelessly communicates position information of each deployed asset along with the asset information.

5. The asset management system of claim 2, wherein the inventory control server is configured to dynamically determine a deficient one of the plurality of assets, wherein a deficient asset is an asset assigned to a mobile entity, which is not detected by the tag scanner located near the mobile entity, wherein the inventory control server is configured to dynamically determine a surplus asset capable of replacing the deficient asset, and wherein the inventory control server dynamically reassigns the surplus asset to the mobile entity.

* * * * *